Jan. 23, 1962   F. S. KORSKI ET AL   3,017,906
WIRE TWISTING AND CUT-OFF DEVICE
Filed Dec. 22, 1958
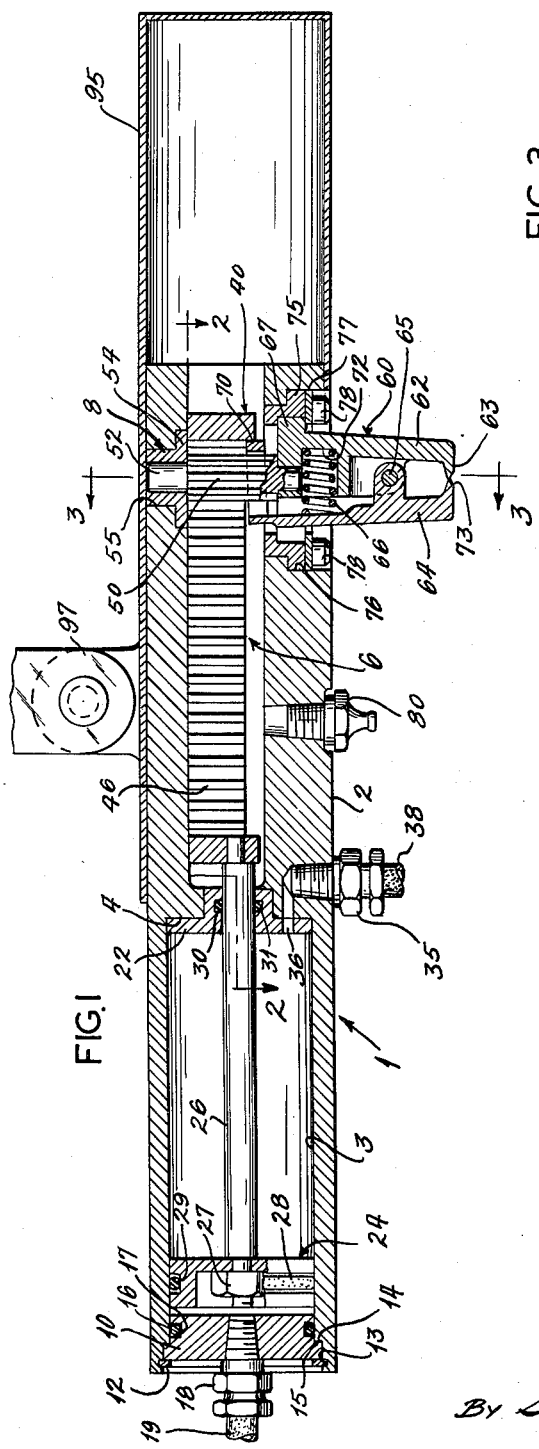
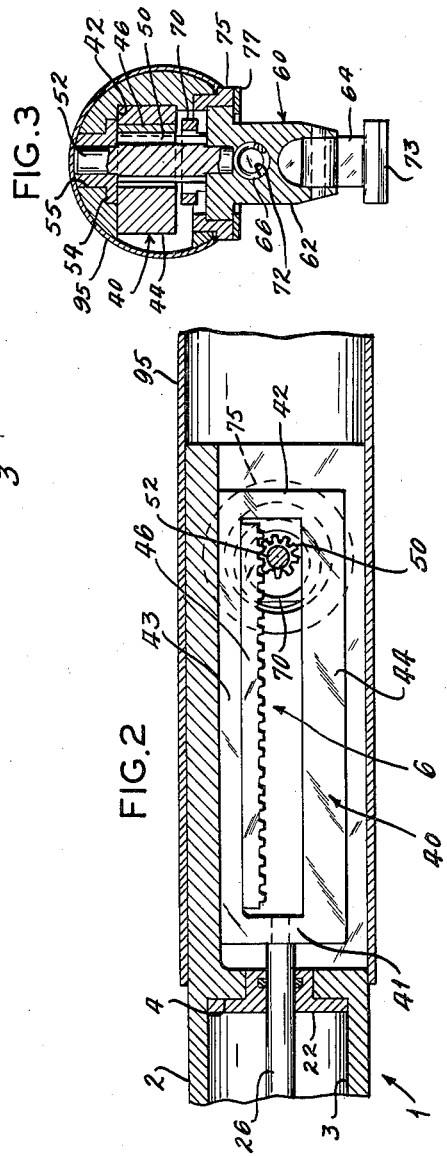
INVENTORS:
FRANK S. KORSKI
RAYMOND E. MARTIN
ATTORNEYS

United States Patent Office 3,017,906
Patented Jan. 23, 1962

3,017,906
WIRE TWISTING AND CUT-OFF DEVICE
Frank S. Korski, Brentwood, and Raymond E. Martin, Maplewood, Mo., assignors to The Emerson Electric Manufacturing Company, St. Louis, Mo., a corporation of Missouri
Filed Dec. 22, 1958, Ser. No. 782,023
5 Claims. (Cl. 140—119)

This invention relates to a device and a method for twisting together a plurality of wires or the like, and thereafter cutting them. The term "wires" is used broadly to include any wire-like material, metallic or not, but the invention has its chief application to electrically conductive wires.

It is common practice in making electrical connections, to twist a pair of wires together, and then to cut off the untwisted ends. In manufacturing fractional horsepower motors, for example, the ends of the windings of the north and south poles are connected together to form a continuous circuit. Commonly this is done by first removing the insulation from the ends of the pole windings, then twisting them together by hand, manually cutting off the untwisted ends, and soldering the joints. Another way of doing the job consists of twisting the insulated wires together, cutting off excess wire, and then welding the twisted wires, the insulation being burned off in the process. In either event, the wires have been twisted by hand, and cut off by hand.

One of the objects of this invention is to provide a machine which will twist together a plurality of wires, and will, after they have been twisted through a predetermined number of turns, cut them off.

Another object is to make a machine which is simple, rugged, light in weight, and dependable.

Other objects will become apparent to those skilled in the art in the light of the following description and accompanying drawings.

In accordance with this invention, generally stated, a wire-twisting and cut-off device is provided with jaw members, at least one of which has a shearing edge. The jaw members are mounted on a power-rotated spindle. The jaw members are power-actuated to open to receive the wires to be twisted. When they are not forced open, the jaw members are normally urged into engagement with one another with sufficient force to hold wires without shearing them. While the wires are being held, the jaw members are rotated by the spindle. After the spindle has rotated through a predetermined number of revolutions, power actuated means force the jaw members together with a force sufficient to shear the wires.

In the drawing, FIG. 1 is a longitudinal sectional view, with a part broken away, of one illustrative embodiment of device of this invention;

FIG. 2 is a sectional view taken along the line 2—2 of FIG. 1; and

FIG. 3 is a sectional view taken along the line 3—3 of FIG. 1.

Referring now to the drawing, reference numeral 1 indicates a wire twister and cut-off machine constructed in accordance with one illustrative embodiment of this invention. The machine 1 of this embodiment is adapted to be driven by a fluid such as compressed air. The machine 1 has a body 2. The inside of one end of the body 2 constitutes a cylinder 3. Within the body 2, one face of an annular shoulder 4 defines the inner end of the cylinder 3; the other face defines the inner end of a rack guide section 6. Near the outer end of the rack guide section 6, the body 2 has a jaw assembly receiving section 8.

The outer end of the cylinder 3 is closed with a cylinder head 10, held in place by a snap ring 12. The snap ring 12 seats in an annular groove 13 in the inside wall of the body 2. The cylinder head 10 and the body are stepped complementarily to provide shoulders 14 and 15 respectively, which abut to prevent axial movement of the cylinder head 10 inwardly of the body. The cylinder head is sealed against fluid leakage, by an O-ring 16, seated in an annular groove 17 in the cylinder head. The cylinder head 10 is drilled and tapped to receive a fitting 18. A flexible hose 19, connected to fitting 18, is connected at its other end to a four-way valve, not here shown, which in turn, is connected to a source of fluid under pressure, such as an air compressor, also not here shown.

At the end of the cylinder 3 opposite the cylinder head 10, a bushing 22 is press fitted into the opening defined by the annular shoulder 4. A piston 24 is slidably mounted in the cylinder 3. The piston 24 is attached to the end of a piston rod 26 by means of a nut 27. An O-ring 28, seated in an annular groove 29 in the piston 24 and bearing against the cylinder wall, serves to seal the piston.

The piston rod 26 extends through the bushing 22, into the rack guide section 6. An O-ring 30, seated in an annular groove 31 in the bushing 22, and bearing on the piston rod 26, serves to seal the cylinder 3 from the rack guide section 6.

Between the cylinder 3 and the rack guide section 6, the body 2 is drilled and tapped to receive a fitting 35. A passage 36 communicates at one end with the cylinder 3 and at the other end with the opening in the fitting 35. A flexible hose 38 is connected to the fitting 35 at one end, and to the four-way valve, to which the flexible hose 19 is connected, at the other.

Within the rack guide section 6, the piston rod 26 is connected to a rack carriage 40. The rack carriage 40 consists of a rectangular frame, with an inner end 41, an outer end 42, a rack side 43 and a smooth faced side 44. A rack 46 is secured to the inner face of the rack side 43.

The rack carriage 40 embraces, and the rack 46 engages a pinion 50. The pinion 50 is carried by a spindle 52, the upper end of which is journalled in a bushing 54 in an opening 55 in the jaw assembly receiving section 8 of the body 2. Connected to the lower end of the spindle 52 is a jaw assembly 60, which, in this embodiment, is made up of a fixed jaw member 62, secured at its top directly to the lower end of the spindle 52, a movable jaw member 64, and a spring 66. The movable jaw 64 is pivoted, by means of a pivot pin 65, to the fixed jaw 62.

The fixed jaw 62 has a shearing edge 63 at its lower end. At its top, the fixed jaw 62 has a circular rim 67. The circular rim 67 takes the form of a shoulder through a little more than 180°, as shown particularly in FIGS. 1 and 3, and a ring through the remainder of its circumference, as shown in FIG. 1. The upper end of the movable jaw 64 extends within the ring section of the rim 67 of the fixed jaw 62, and is provided at its upper end with a ring 70. The ring 70 extends around and clear of the pinion 50. The spring 66 projects from a seat 72 in the fixed jaw 62, and bears against the inside surface of movable jaw 64 above pivot pin 65. A shearing edge 73 of the movable jaw 64 is biased into engagement with the shearing edge 63 of the fixed jaw member 62 by the spring 66, which is compressed between the two jaw members.

The rim 67 of the fixed jaw member 62 is journalled in a stepped bushing 75, in an opening 76 in the jaw assembly receiving section of the body 2.

The jaw assembly, spindle and pinion are held against downward displacement by a removable washer-like plate 77, held in place by studs 78.

Between the fitting 35 and the opening 76, in the rack guide section 6 of the body 2, the body is bored and tapped to receive a lubricant fitting 80.

A housing 95 serves as an enclosure to prevent the escape of lubricant and the entrance of dirt into the rack and pinion and jaw assembly mechanism, and also serves as a guard, since the rack carriage moves beyond the end of the body when the device is in use.

An arm 97, connected to the body 2, is provided so that the machine can either be mounted on a stand, or used portably.

In operation, assuming the machine to be in the condition shown in FIG. 1, fluid under pressure is admitted to the cylinder 3 through the fitting 18, while, at the same time, the fitting 35 and hose 38 are connected to permit any fluid on the opposite side of the piston 25 to exhaust through them. The pressure of the fluid on the side of the piston next to the cylinder head 19 causes the piston, and piston rod 26, hence the rack carriage 40, to move to the right as viewed in FIG. 1.

As the rack carriage 40 moves to the right, the teeth on the rack 46, engaging the teeth of the pinion 50, cause the pinion, hence the jaw assembly, to rotate clockwise as viewed in FIG. 2. When the inner end 41 of the rack carriage 40 reaches the position immediately above the bushing 75, the jaw assembly is approaching the position in which it is shown in FIG. 1, so that with continued movement of the rack carriage to the right, the inner end 41 engages the upper end of the movable jaw member 64, and rocks the jaw member 64 about the pivot pin 65, against the bias of the spring 66.

A plurality of wires or the like can then be inserted in the space between the shearing edges 63 and 73 of the fixed and movable jaw members. The control valve is now moved to the position where fluid under pressure is admitted through the flexible hose 38, fitting 35 and passage 36, and fluid is permitted to exhaust through the fitting 18 and hose 19. This moves the piston 24, hence the piston rod 26 and rack carriage 40, to the left as viewed in FIG. 1. As the rack carriage 40 moves to the left, the end 41 of the rack carriage moves away from the upper end of the movable jaw 64, permitting the spring 66 to rock the movable jaw about the pivot pin 65, to wire-gripping position, so that the wires are held between the shearing edges 63 and 73. The bias of the spring 66 is not sufficient to cause the shearing edges 63 and 73 to cut through the wires, but is sufficient to ensure that the wires are gripped firmly. As the rack 46 continues its travel toward the left, pinion 50 turns through a known number of revolutions thereby twisting the wires about each other, until, when the rack carriage 40 has reached the position shown in FIGURE 1, the outer end 42 of the rack carriage strikes the ring 70 at the upper end of the movable jaw 64. The blow delivered to the ring 70 by the end 42, is sufficient to cause the shearing edges 63 and 73 to cut off the wires which have been grasped between them.

The valve is then turned to admit fluid again to the cylinder between the cylinder head and the piston, and exhaust the fluid between the piston and the cylinder bushing 22, and the cycle is repeated.

It can be seen that, while the embodiment described has many advantages, numerous variations in the construction of the device, within the scope of the appended claims, will occur to those skilled in the art in the light of the foregoing disclosure. For example, the power means for operating the rack may take the form of a solenoid coil or the like. Other means, responsive to the rotation of the jaw members through a predetermined number of revolutions can be employed to produce the blow necessary to cut off the wires. The jaw members may be differently constructed. For example, one of the lower edges of the jaw members can be made flat to form an anvil against which the shearing edge of the other jaw member can operate.

Having thus described the invention what is claimed and desired to be secured by Letters Patent is:

1. A wire twisting and cut-off device, comprising a rotatable jaw assembly having first and second jaw members, said first jaw member being mounted pivotally on said second jaw member for rotation therewith and for movement between wire-admitting and wire-gripping positions, means for biasing said first jaw member into wire gripping position, a rotatably mounted spindle on one axial end of which said second jaw member is mounted for rotation therewith, and a pinion on said spindle; a rack engaging said pinion; a rack carriage, carrying said rack; and power means for reciprocatingly driving said rack carriage, said jaw members having a gripping and shearing part on one side of the place at which the first jaw member is pivoted on the second jaw member, and said first jaw member having a ring on the other side thereof, said ring extending around and clear of said spindle, and said rack carriage having a part engaging said ring at one extreme of the travel of said carriage, to move said first jaw member, against the bias of the means biasing the first jaw member toward wire gripping position, to wire-admitting position, and a part engaging said ring at the other extreme of the travel of said carriage, to administer a shearing force to said first jaw member.

2. A wire twisting and cut-off device, comprising a body; a spindle rotatably mounted on said body; jaw members, at least one of which has a shearing edge, carried by said spindle for rotation therewith, said jaw members being mounted for movement relative to one another between a position at which wires to be twisted are freely insertable between them and a position at which inserted wires are severed by them; biasing means connected with said jaw members for biasing said jaw members toward severing position with a force insufficient to sever said wires but sufficient to grip the wires for twisting; power means connected to said spindle for rotating said spindle, hence said jaws, said power means being arranged to operate in a fixed predetermined cycle; jaw opening means, positioned to engage a jaw member and responsive to the operation of the power means at one point in said cycle, for moving the jaw member to the position at which the wires can be inserted between the said jaw members, and shearing force applying means positioned to engage said jaw member and responsive to the operation of the power means at another point in the said cycle, after said spindle has been rotated a predetermined number of times, for forcing said jaw member to wire-severing position.

3. A wire twisting and cut-off device comprising a body; a spindle rotatably mounted on said body; a jaw assembly having one fixed jaw, one movable jaw and biasing means urging said movable jaw to closed position with respect to the fixed jaw, all mounted on an end of said spindle for rotation therewith, at least one of said jaws having a shearing edge, and said biasing means urging the jaws to closed position with a force sufficient to grip wires for twisting but insufficient to shear said wires; a reciprocating driving means connected to said spindle and mounted on a carriage having at one end a jaw opening part adapted to cause the movable jaw to move, against the bias of the biasing means, to wire-receiving position, and at its other end a part adapted to cause the said movable jaw to move to wire shearing position, and power means connected to said carriage to drive said carriage reciprocally.

4. The device of claim 3 wherein the spindle carries a pinion and the driving means on the carriage is a rack, in operative engagement with said pinion.

5. The device of claim 3 wherein the movable jaw is pivoted diametrically of the spindle, with a gripping part positioned complementarily to a gripping part of the fixed jaw, on one side of the pivot, and a lever arm, extending adjacent said carriage, on the other side of said pivot, wherein said jaw opening part is a part of said carriage which engages one side of the lever arm at one throw of the carriage and wherein the jaw closing part is a part of said carriage which engages the other side of said lever at the opposite throw of said carriage.

References Cited in the file of this patent
UNITED STATES PATENTS

| | | |
|---|---|---|
| 1,469,711 | Bauwens | Oct. 2, 1923 |
| 1,641,822 | Mattson | Sept. 6, 1927 |